(12) United States Patent
Willig

(10) Patent No.: US 11,791,681 B2
(45) Date of Patent: Oct. 17, 2023

(54) ELECTRIC MACHINE WITH MULTIPOLE MAGNET SEGMENTS

(71) Applicant: Robert Bosch GmbH, Stuttgart (DE)

(72) Inventor: Matthias Willig, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 354 days.

(21) Appl. No.: 17/263,232

(22) PCT Filed: Jul. 23, 2019

(86) PCT No.: PCT/EP2019/069792
§ 371 (c)(1),
(2) Date: Jan. 26, 2021

(87) PCT Pub. No.: WO2020/020882
PCT Pub. Date: Jan. 30, 2020

(65) Prior Publication Data
US 2022/0352772 A1  Nov. 3, 2022

(30) Foreign Application Priority Data

Jul. 27, 2018  (DE) .................... 10 2018 212 573.2

(51) Int. Cl.
*H02K 1/27915*  (2022.01)
*H02K 21/22*  (2006.01)
*H02K 1/2791*  (2022.01)

(52) U.S. Cl.
CPC ....... *H02K 1/2791* (2022.01); *H02K 1/27915* (2022.01); *H02K 21/22* (2013.01)

(58) Field of Classification Search
CPC .. H02K 1/27915; H02K 21/22; H02K 1/2781; H02K 2201/06; H02K 2213/03; H02K 1/2791

(Continued)

(56) References Cited

U.S. PATENT DOCUMENTS 5,095,238 A * 3/1992 Suzuki ................. H02K 1/2786
                                                  310/67 R
9,130,441 B2 * 9/2015 Okada ...................... H02K 1/28
(Continued)

FOREIGN PATENT DOCUMENTS

DE        4205255 A1    8/1993
DE        10204891 A    8/2003
(Continued)

OTHER PUBLICATIONS

Translation of International Search Report for Application No. PCT/EP2019/069792 dated Oct. 29, 2019 (2 pages).

*Primary Examiner* — John K Kim
(74) *Attorney, Agent, or Firm* — Michael Best & Friedrich LLP

(57) ABSTRACT

The invention relates to an electric machine (1) comprising a stator (10) and a rotor (20) separated from the stator (10) by way of an air gap, wherein the rotor (20) has a plurality of shell-like magnet segments (30) secured to a rotor body (22), and wherein the magnet segments (30) have in the circumferential direction in each case a plurality of sections (32, 33, 34) with different magnetic polarizations, which each form a magnetic pole of the rotor (20), and wherein transition zones (36) are formed between the sections (32, 33, 34) of the magnet segments (30) with different magnetic polarizations, wherein recesses (40) are provided in the magnet segments on the side facing the stator (10). It is proposed that the transition zones (36) are formed so as to run obliquely in the axial direction of the rotor (20) and that the transition zones (36) are formed in the region of the recesses (40).

15 Claims, 5 Drawing Sheets

(58) Field of Classification Search
USPC .................................................. 310/156.46
See application file for complete search history.

(56) References Cited

U.S. PATENT DOCUMENTS

| | | | |
|---|---|---|---|
| 10,530,208 B2 * | 1/2020 | Buehler | H02K 1/16 |
| 2006/0055266 A1 * | 3/2006 | Iwami | H02K 1/2733 |
| | | | 310/43 |
| 2006/0244336 A1 * | 11/2006 | Makita | H02K 29/03 |
| | | | 310/216.107 |
| 2008/0157619 A1 * | 7/2008 | Wu | H02K 29/03 |
| | | | 310/156.48 |
| 2012/0098382 A1 * | 4/2012 | Lau | H02K 29/03 |
| | | | 310/216.118 |
| 2018/0191213 A1 * | 7/2018 | Buehler | H02K 29/03 |
| 2022/0352772 A1 * | 11/2022 | Willig | H02K 1/27915 |

FOREIGN PATENT DOCUMENTS

| | | |
|---|---|---|
| DE | 102005043873 A1 | 4/2006 |
| DE | 102012221039 A | 5/2014 |
| DE | 102012221039 A1 * | 5/2014 |
| DE | 102015212165 A1 | 1/2017 |
| DE | 102015013690 A1 | 4/2017 |
| JP | 2008067561 A * | 3/2008 |
| WO | 2017001159 A1 | 1/2017 |
| WO | WO 2017001159 A1 * | 1/2017 |

* cited by examiner

ELECTRIC MACHINE WITH MULTIPOLE MAGNET SEGMENTS

BACKGROUND

The invention relates to an electric machine comprising a stator and a rotor separated from the stator by an air gap.

Electric machines comprising a stator and a rotor separated from the stator by an air gap and with shell-like magnet segments are known from DE 102015212165 A1. Therein, the magnet segments are arranged in respective opposing pairs and each have, in the circumferential direction, multiple magnetically differently polarized sections. The magnetically differently polarized sections each form a magnetic pole of the rotor. Furthermore, recesses are provided on the side facing the stator, which serve as pole clearances.

SUMMARY

The electric machine according to the invention comprises a stator and a rotor separated from the stator, in particular by an air gap. The rotor has at least one, in particular multiple, shell-like magnet segments fastened to a rotor body. The magnet segments each have multiple magnetically differently polarized sections. The magnetically differently polarized sections of a magnet segment are formed in the circumferential direction of the rotor. The magnetically differently polarized sections each form a magnetic pole of the rotor.

Transition zones are formed between the magnetically differently polarized portions of the magnet segments, which transition zones are characterized by the fact that they form magnetically nonpolarized, in particular magnetically weakly polarized sections. The transition zones are not, in particular not intentionally, polarized during the magnetic polarization. The transition zones are therefore designed to be magnetically unpolarized, or magnetically weakly polarized.

Furthermore, the magnet segment has at least one, in particular at least two, recesses, which are characterized in particular by the fact that the distance of the magnet segment to the stator is enlarged in the region of the recess and/or that the thickness of the magnet segment is minimized in the region of the recess. The recesses are provided on the side facing the stator.

Advantageously, the transition zones are designed to extend obliquely in the axial direction of the rotor. In particular, the oblique extension is characterized by the formation of an angle between the transition zone and the axial direction.

It is also advantageous that the transition zones are formed in the region of the recesses. The design of the electric machine according to the invention results in a minimization of the detent torque, in particular of the cogging torque and the torque ripple associated with it. In particular, asymmetries of the induced voltage can furthermore also be reduced. Furthermore, detent torques occurring in addition to the fundamental order can be minimized.

According to an advantageous refinement, it is provided that a recess extends across the entire magnet segment in the axial direction. The recess extends from the top to the bottom of the magnet segment, and vice versa.

Furthermore, it is advantageous that each recess extends completely across a transition zone, as viewed in the circumferential direction. Each transition zone is formed completely in the region of a recess. Furthermore, the oblique form of the transition zone has the effect that the two magnetically differently polarized sections separated by the transition zone are also at least partially formed in the magnet segment in the region of the recess.

According to a refinement of the invention, each transition zone extends across the entire width of the recess in whose region of the magnet segment said transition zone is formed.

According to a preferred refinement of the invention, the, in particular tangential, edge regions of the recesses extend in the circumferential direction parallel to the axial direction.

According to an advantageous embodiment of the invention, it is provided that the ratio between the magnetically differently polarized sections of a magnet segment and the magnet segment is 2n+1:1. This results in minimized cogging. Furthermore, cost advantages result for an electric machine.

According to an advantageous embodiment of the invention, it is provided that the ratio between the width of a magnetically differently polarized section and the width of a transition zone is between 3 and 5, in particular between 3.5 and 4.5. Preferably, the width of a section or the width of a transition zone corresponds to the vertical extent starting from the oblique extent along the surface of the magnet segment. Preferably, the greatest possible value is used as the measure for determining the ratio.

According to an advantageous embodiment of the invention, it is provided that the magnetic polarization of the sections is designed to alternate in the circumferential direction. The result is a magnetically alternately polarized pole sequence in the circumferential direction. Preferably, the magnetically alternately polarized pole sequence extends across all magnet segments.

According to a preferred embodiment of the invention, it is provided that the magnet segments have further, in particular second, recesses on the side facing the stator. The further recesses are in each case formed in one of the two edge regions, in particular edge zones, of the magnet segment. The edge regions are the regions of the magnet segment which adjoin the edge, as viewed in the circumferential direction. These therefore are the regions which, in a radial view of the magnet segment, are positioned completely on the far right and/or on the far left. Preferably, the extent of the edge regions corresponds to between 1 to 2 times the extent of the further recess in the circumferential direction.

An advantageous refinement is that at least one second transition zone is formed in the region of each of the further recesses. The second transition zone in particular extends obliquely in the axial direction. The second transition zone represents a magnetically nonpolarized region of the magnet segment. Furthermore, the oblique form of the second transition zones has the effect that the adjoining magnetically differently polarized section is also at least partially formed in the magnet segment in the region of the recess. According to a refinement, the second transition zones may be of triangular form. Preferably, one second transition zone is formed in the right lower region, and another is formed in the left upper region, of the recess in a radial view. The second transition zones are formed in the diagonally opposite corners of a magnet segment. Advantageously, the second transition zones separate a small magnetically polarized section from one of the magnetically polarized sections.

The small magnetically polarized section is in particular of triangular form. The small magnetically polarized section is formed in one of the corners of the magnet segment.

A particularly advantageous refinement of the invention is that the further recesses extend across the entire magnet segment in the axial direction. The further recesses extend from the top to the bottom of the magnet segment, and vice versa. Furthermore, it is advantageous that each further recess extends completely across a second transition zone, as viewed in the circumferential direction. Each second transition zone is formed completely in the region of a further recess.

An advantageous refinement is that the second transition zones extend across a circumferential air gap, which is formed between two magnet segments in the circumferential direction. The second transition zones of two magnet segments and the circumferential air gap form a magnetically nonpolarized region, corresponding to a transition zone between two differently polarized sections of the adjacent magnet segments.

An advantageous embodiment is that the transition zones extend parallel to each other. Preferably, all transition zones of one or all magnet segments have the same angle relative to the axial direction.

An advantageous refinement is that the magnet segment is of radially or elliptically concave form on the side facing the stator in the region of the recesses or of the further recesses.

According to a preferred embodiment of the invention, it is provided that the magnet segments have, on the side facing the stator, as viewed in the circumferential direction, a decrease of the thickness of the magnet segment which extends toward the edges of the magnet segments, in particular tangentially. Preferably, the air gap is widened in the edge region of the magnet segment. Preferably, the magnet segment is of radially or elliptically concave form in the edge region. Preferably, at least one magnet segment, in particular all magnet segments, has a widening of the air gap, in a radial view, toward the left and the right edge of the magnet segment.

BRIEF DESCRIPTION OF THE DRAWINGS

Exemplary embodiments are shown in the drawings and explained in more detail in the following description. In the drawings.

DETAILED DESCRIPTION

Figure 1:
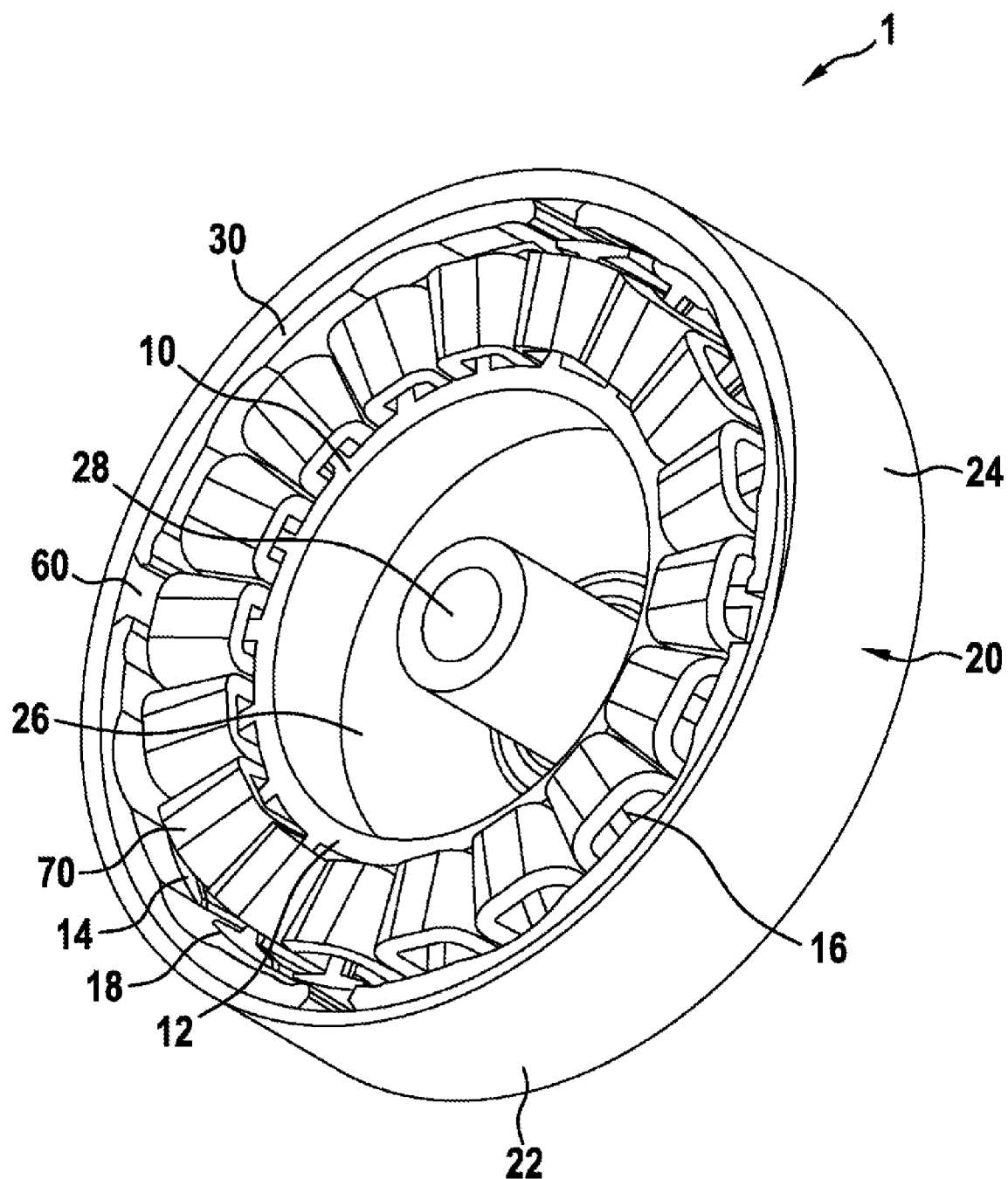
FIG. 1 shows a perspective view of a stator and rotor of an electric machine according to the invention.

An electric machine 1 according to the invention comprises a stator 10 and a rotor 20. In FIG. 1, the stator 10 and the rotor 20 of an electric machine 1 according to the invention are shown. Other components of an electric machine 1, such as a shaft, or an axle, a set of control electronics and housing parts are not shown for the sake of clarity.

The electric machine 1 in particular is an electric motor for driving a fan, preferably a fan for cooling drive components of a motor vehicle. The electric machine 1 can also be used to drive a fan in an HVAC system, in particular of a motor vehicle.

The rotor 20 surrounds the stator 10 concentrically. The rotor 20 shown in the example in FIG. 1 is designed to be positioned radially on the outside relative to the stator 10. The rotor 20 is designed to be rotatable relative to the stator 10. The electric machine 1 in the example shown in FIG. 1 is designed as an external rotor motor.

According to a refinement, the electric machine 1 can also be designed as an internal rotor motor, wherein the rotor is concentrically surrounded by the stator.

The stator 10 has a hollow cylindrical base element 12. The base element 12 forms a magnetic return path element of the stator 10. The stator 10 comprises a plurality of, here in particular 18, stator teeth 14. The stator teeth 14 are arranged equidistantly over the circumference of the base element 12. The stator teeth 14 protrude radially from the base element 12. Grooves are formed between the stator teeth 14 in the circumferential direction. The individual stator teeth 14 do not touch each other. The grooves are formed so as to be equidistantly distributed. Preferably, a magnetic flow is possible between the stator teeth 14 via the base element 12.

Each stator tooth 14 has a tooth shank 16 and a tooth tip 18. At least one stator coil 70, which forms windings, is wound on the tooth shanks 16. Each stator coil 70 is held at the end sides on the one hand by the tooth tip 18 and on the other hand by the base element 12. A movement of the stator coil in or counter to the radial direction is prevented by the tooth tips 18 and/or the base elements 12. The grooves adjacent to the stator tooth 14 are half-filled by a respective stator coil 70.

The hollow cylindrical base element 12 and the stator teeth 14 are composed of a plurality of sheet-metal laminae which are lined up one after the other in an axial row and which lie against one another. The sheet-metal laminae are held together in particular by means of punch stacking.

A magnetic rotary field is generated by means of appropriate energization of the stator coils in particular by means of a set of control electronics, which rotary field causes the rotor 20 to move correspondingly. Bridge circuits, in particular a B6 bridge made of electrical switches, in particular MosFet or transistors, are used for the energization.

The rotor 20 has a rotor body 22. The rotor body 22 has a magnetic return path element 24 and a connecting element 26. The connecting element 26 connects the return path element 24 to a shaft receptacle 28.

The magnetic return path element 24, in particular also referred to as a return path yoke, is of hollow cylindrical form in the example in FIG. 1. The return path element 24 engages with a shaft receptacle 28 via at least one connecting element 26. The magnetic return path element 24 and the connecting element 26 form a cylinder pot. The lateral surface of the cylinder pot is formed by the return path element 24. The bottom of the cylinder pot is formed by the connecting element 26. The connecting element 26 is formed in particular as a flat, preferably metal-sheet-like bottom or has at least one spoke, which connects the hollow-cylindrical return path element 24 to the shaft receptacle 28. Preferably, the connecting element 26 has continuous recesses, in particular holes or slots, which for example lower the weight of the rotor 20 or improve the air circulation or compensate for imbalances.

Furthermore, the rotor 20 has multiple magnet segments 30. As an example, the rotor 20 according to FIG. 1 supports four magnet segments 30. The magnet segments 30 in particular are formed as permanent magnet segments, or permanent magnets. The magnet segments 30 are of shell-like form. The outer circumference of the magnet segments is adapted to the inner circumference of the rotor body 22.

The magnet segments 30 bear in particular with their radially outer circumference against the inner circumference of the rotor body 22. The rotor body 22 and the magnet segments are connected to one another in particular by means of a welded, adhesive, soldered, plugged, screwed, or riveted connection or similar.

Preferably, the magnet segments 30 have, in particular at least two, support points. The support points extend in the axial direction. Adhesive is placed between the support points and the rotor body 22.

The magnet segments 30 are arranged equidistantly over the circumference. A circumferential air gap 60 is formed between two magnet segments which are adjacent in the circumferential direction. The number of the circumferential air gaps 60 corresponds to the number of magnet segments 30. The outer circumference of the magnet segments is of radially concave form. Preferably, the basic shape of the magnet segments 30 substantially corresponds to a sector of a hollow cylinder.

An air gap is formed between the magnet segments 30 and the tooth tips 18.

Figure 2:
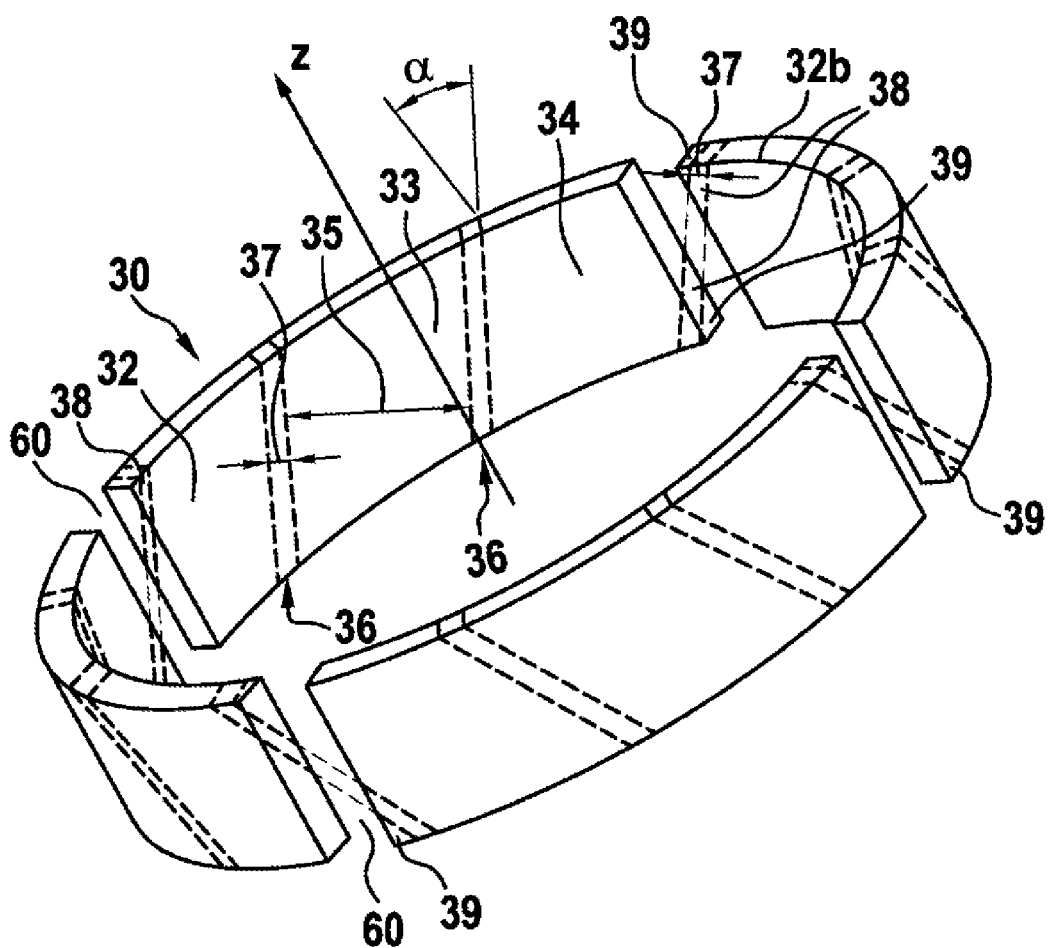
FIG. 2 shows a perspective view of the magnet segments.

FIG. 2 shows a perspective view of the magnet segments 30. The magnet segments 30 are shown correspondingly to their arrangement on the main body 22. The other components of the electric machine 1 are not shown for the sake of clarity. The magnet segments 30 each have, in the circumferential direction, multiple magnetically differently polarized sections 32, 33, 34. The polarization of the sections is executed in such a way that a pole sequence, i.e., north-south-north, etc., forms in the circumferential direction along the surface facing the stator.

Preferably, the shape of all magnet segments 30 of an electric machine 1 is identical. The only differences between the magnet segments 30 exist in the polarization of the individual sections of the magnet segments.

The magnetically differently polarized sections 32, 33, 34 each form a magnetic pole of the rotor 20. The ratio between the poles of the rotor 20 and the magnet segment 30 is:

2n+1:1 where n represents a natural number. Each magnet segment 30 has, for example, 3, 5, 7, 9, 11, etc. magnetically differently polarized sections 32, 33, 34, in particular in the circumferential direction. The pole sequence in circumferential direction is north-south-north or south-north-south. In particular, in the case of an electric machine 1 with twelve poles on four magnet segments 30, it results in a pole sequence of north-south-north, south-north-south, north-south-north and south-north-south.

Permanent magnets each have a north and a south pole. The sections 32, 33, 34 are polarized such that the antipole is formed on the surface located on the outside in the radial direction, that is, the surface facing away from the stator. For example, if the section 32 has a magnetically positive pole on the side facing the stator, the magnetically negative pole is located on the side facing away.

Each of the magnet segments 30 has a respective edge at those ends of the magnet segments 30 which are located opposite each other in the circumferential direction. The edge of the magnet segments is taken to mean the left and the right end of the magnet segment 30, as viewed in the radial direction. The edge regions of the magnet segments 30 adjoin the edges.

The outer sections 32, 34, as viewed in the circumferential direction, are designed to be of substantially the same size. The sections 32, 34 in each case adjoin an edge of a magnet segment. The outer sections are formed in each case partially in an edge region of the magnet segments 30. Preferably, a magnet segment 30 is formed in each edge region.

The sections 33, which are located between the two outer sections in relation to the circumferential direction, will be referred to hereinafter as inner section. Inner sections are the sections that do not adjoin or extend up to the edge. All inner sections 33 are also designed to be of the same size. However, there is only one inner section 33 in the design according to FIG. 1.

In particular, "of the same size" is taken to mean that they occupy the same surface area, in particular the surface area of the inner circumference of the magnet segment 30. The surface of the inner circumference of a magnet segment is taken to mean that surface of the magnet segment 30 which faces the stator 10 of the electric machine 1.

Transition zones 36 are formed between the differently polarized sections 32, 33, 34. The transition zones 36 are magnetically unpolarized. In particular, the transition zones are not intentionally magnetically polarized. However, they usually nevertheless have a weak magnetic polarization. Ideally, the transition zones 36 are designed to not be magnetically polarized. The transition zones 36 have no properties of a permanent magnet. The transition zones are not permanently magnetized. The transition zones also form pole transitions.

Preferably, the transition zones do not form the transition between the north and south poles of a magnetically polarized section 32, 33, 34.

The ratio between the width 37 of a transition zone and the width 35 of a section is between 1:3 and 1:5. The width corresponds to the vertical extent starting from the oblique extent along the surface of the magnet segment 30.

The magnetic transition zones 36 in particular form a separation between the sections 33, 33, 34. The transition zones 36 are formed so as to be oblique, in particular skewed, in the axial direction of the rotor 20. The transition zones 36 extend obliquely relative to the axial direction of the electric machine 1. An angle alpha is formed between the transition zones 36 and the axial direction. The angle alpha is in particular 18 to 20 degrees, preferably about 19 degrees. The angle alpha depends on the angle of inclination. The angle of inclination in particular is 11 to 13 degrees, preferably about 11.8 degrees. The angle of inclination depends on the topology of the electric machine 1. Preferably, the angle alpha is dependent on the topology of the electric machine 1.

The axial direction z of the rotor 20 extends parallel to the shaft. Preferably, the sections 32, 33, 34 overlap in the axial direction. The first transition zones 36 of a magnet segment 30 extend parallel to each other. The first transition zones 36 of a magnet segment 30 extend over the entire axial extent of the magnet segment 30. The first transition zones are formed so as to be continuous in the radial direction.

Figure 3:
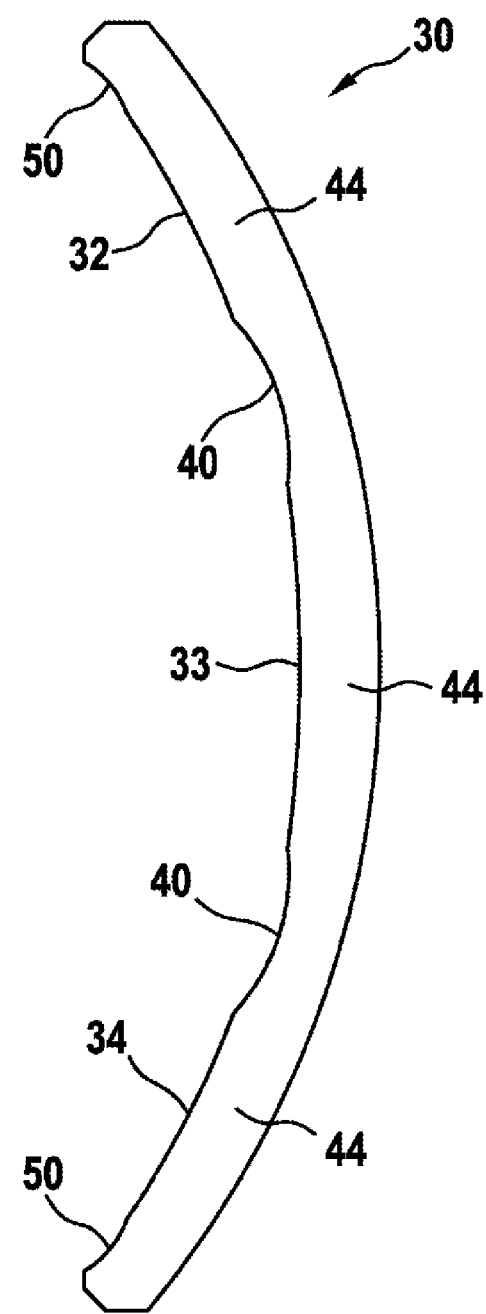
FIG. 3 shows a sectional view through a magnet segment.

FIG. 3 shows a sectional view through a magnet segment 30 according to FIG. 1 and FIG. 2. The magnet segment 30 also has three sections 32, 33, 34. Recesses 40 are formed in the region of the first transition zones 36. The recesses 40 are formed on that side of the magnet segment 30 which faces the stator. The recesses 40 in particular form pole clearances. The first transition zones 36 extend in the region of the recesses 40. Preferably, the first transition zones 36 are formed completely in the region of a recess 40 of a magnet segment 30.

According to a refinement, the recesses extend at least across a portion of the first transition zones.

FIG. 3 shows a magnet segment 30 with three magnetically differently polarized sections 32, 33, 34. The sections 32, 33, 34 are partially formed in the region of the recesses 40. In particular, a superposition of two adjacent sections in the axial direction results depending on the inclination of the first transition zones 36.

According to an optional refinement of the invention, the two outer sections 32, 34 as viewed in the circumferential direction have a contour that tangentially widens slightly toward the edge of the magnet segment 30. The slightly widening contour results in a radially or elliptically concave edge region of the magnet segment 30. Furthermore, the thickness of the magnet segment 30 decreases tangentially toward the edge of the magnet segment 30.

The magnet segment 30 is preferably designed to have the greatest thickness at its center as viewed in the circumferential direction. Preferably, the magnet segment has the greatest thickness in the region of the inner sections 33.

Figure 4:
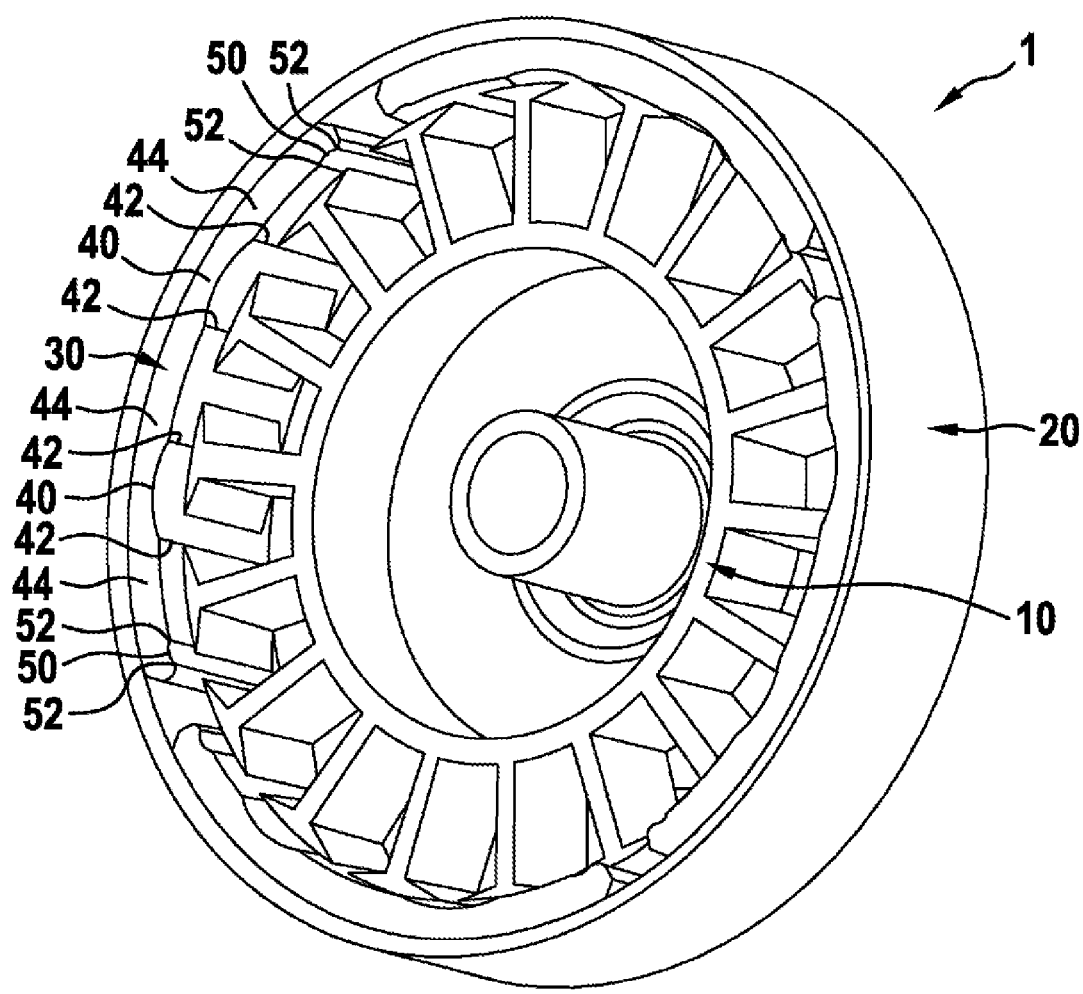
FIG. 4 shows a perspective view of the stator and rotor of the electric machine without the stator coils.

FIG. 4 shows a perspective view of the stator 10 and the rotor 20 of the electric machine 1 without the stator coils 70. The recesses 40 extend across the entire magnet segment 30 in the axial direction of the rotor 20.

The edge regions 42 of the recesses 40 are formed so as to be parallel to the axial direction of the rotor 20. In the circumferential direction, each recess 40 extends at least across the extent of a transition zone 36 in the circumferential direction.

According to a refinement, the extent of the recesses 40 in the circumferential direction corresponds to the extent, in the circumferential direction, of the parts 44 of the magnet segment 30 which are formed between two recesses 40. The extent of the recesses 40 in the circumferential direction of a magnet segment 30, in particular of all magnet segments 30 of a rotor 20, is the same. The extent, in the circumferential direction, of those parts 44 of the magnet segment 30 which are formed between two recesses 40 is the same.

According to a refinement, the extent of all parts of the magnet segment 30 without recesses 40 or further recesses 50 in the circumferential direction is substantially the same.

The thickness of the magnet segments 30 is less in the region of the recesses 40 than in the parts 44 between the recesses.

The magnet segment is of concave form in the region of the recesses 40. This is shown by way of example in FIG. 3. The magnet segment 30 is in particular of radially or elliptically concave form in the region of the recesses 40. The recesses 40 form a pole clearance.

The ratio between the width of a section 32, 33, 34 and the width of a transition zone is between 3 and 5 to 1.

The magnetic polarization of the sections 32, 33, 34 of all magnet segments 30 alternates in the circumferential direction.

According to a refinement of the invention, the magnet segments 30 have further recesses 50. FIG. 4 shows the further recesses with the reference number 50. The further recesses 50 are formed in the edge regions of the magnet segments 30.

The further recesses 50 are formed on that side of the magnet segment 30 which faces the stator 10. The further recesses 50 lead to a widening of the air gap between rotor 20 and stator 10. The further recesses 50 extend across the entire axial extent of a magnet segment 30 in which they are formed. The edge regions 52 of the further recesses 50 extend parallel to the axial direction. The magnet segment 30 has a lesser thickness in the region of the further recesses 50 than in the region without recesses 44.

The magnet segment 30 has a radially or elliptically concave form in the region of the further recesses 50. The radius of the radially concave form is smaller, especially smaller by ¼, than the radius of the recesses 40.

The recesses 40 and the further recesses 50 form a pole clearance.

Second transition zones 38 are formed in the region of the further recesses 50. The second transition zones 38 are designed to extend obliquely in the axial direction. The second transition zones 38 in particular have a triangular shape. In particular, a further transition zone 38 is formed for each further recess 50.

According to a refinement of the invention, a magnetically polarized section 39 is formed in the corner between a second transition zone 38 and the corner of the magnet segment 30. Such a section 39 is also formed in the diagonally opposite corner of the magnet segment.

In FIG. 2, by way of example, two second transition zones 38 are formed in each case in the edge regions of the magnet segment 30.

The magnet segments 30 are separated from one another by the circumferential air gap 60. The mutually adjacent second transition zones 38 of two magnet segments 30, which are separated from one another by the circumferential air gap, form a further transition zone 37 across the circumferential air gap. The further transition zone 37 extends partially across the two magnet segments 30 as well as across the circumferential air gap 60. Correspondingly to the transition zones 36, the further transition zones 37 also separate two magnetically differently polarized sections, for example the sections 34, 32b according to FIG. 2.

Figure 5A:
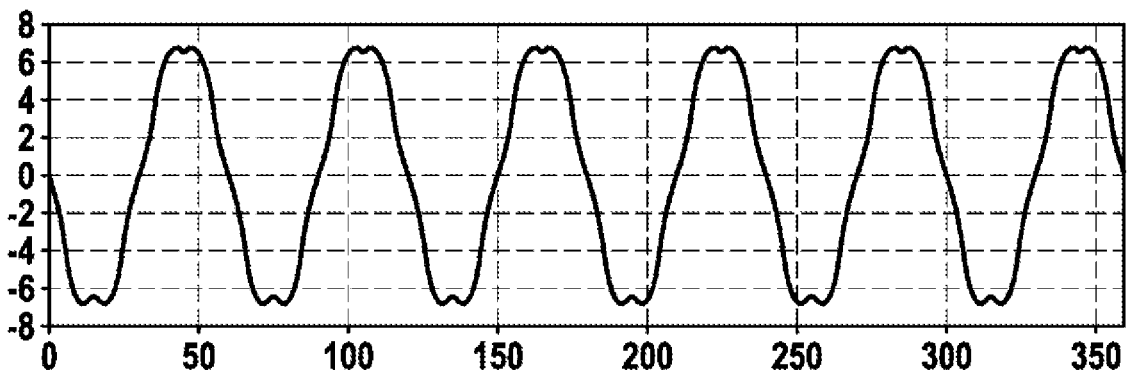
FIG. 5a shows the curve of the induced voltage versus the rotational angle of an electric motor known from the prior art.

FIG. 5a shows the induced voltage of an electric motor known from the prior art. The rotational angle is shown in degrees in the x-direction of the diagram. The induced voltage is shown in the y-direction. The torque ripple, in particular the electric torque ripple ETR, is dependent on the induced voltage.

Figure 5B:
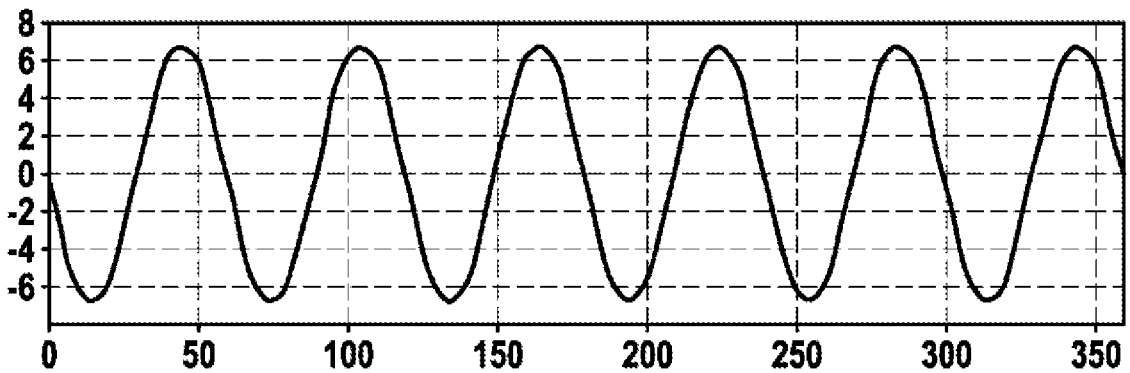
FIG. 5b shows the curve of the induced voltage versus the rotational angle of an electric machine according to the invention.

In contrast, FIG. 5b shows the induced voltage of an electric machine 1 according to the invention. There is no ripple in the apex region.

Overall, with an electric machine 1 according to the invention, the detent torque is able to be reduced by 50% or more compared to the electric motors known in the prior art.

The invention claimed is:

1. An electric machine (1) comprising a stator (10) and a rotor (20) separated from the stator (10) by an air gap, wherein the rotor (20) has multiple shell-like magnet segments (30) fastened to a rotor body (22), and wherein the magnet segments (30) each have, in a circumferential direction, multiple magnetically differently polarized sections (32, 33, 34) which each form a magnetic pole of the rotor (20), and wherein transition zones (36) are formed between the magnetically differently polarized sections (32, 33, 34) of the magnet segments (30), wherein recesses (40) are provided in the magnet segments on a side facing the stator (10), wherein the transition zones (36) are designed to extend obliquely in an axial direction of the rotor (20) and the transition zones (36) are formed in a region of the recesses (40), wherein edge regions (42) of the recesses (40) in the circumferential direction extend parallel to the axial direction.

2. The electric machine (1) as claimed in claim 1, wherein a recess (40) extends across the entire magnet segment (30) in the axial direction and completely across a transition zone (36) in the circumferential direction.

3. The electric machine (1) as claimed in claim 1, wherein a ratio between the magnetically differently polarized sections (32, 33, 34) of a magnet segment (30) and the magnet segment is 2n+1:1, wherein n represents a natural number.

4. The electric machine (1) as claimed in claim 1, wherein a ratio between a width of a section (32, 33, 34) and a width of a transition zone is between 2 and 2.5.

5. The electric machine (1) as claimed in claim 1, wherein the magnetic polarization of the sections (32, 33, 34) is designed to alternate in the circumferential direction.

6. The electric machine (1) as claimed in claim 1, wherein the magnet segments (30) have further recesses (50) on the side facing the stator (10), and that a respective further recess (50) is formed in one of two edge regions of the magnet segment (30), as viewed in the circumferential direction.

7. The electric machine (1) as claimed in claim 6, wherein at least one second transition zone (38) is formed in the region of each of the further recesses (50), which second transition zones (38) extend obliquely in the axial direction.

8. The electric machine (1) as claimed in claim 6, wherein the further recesses (50) extend across the entire magnet segment (30) in the axial direction and completely across a second transition zone (38) in the circumferential direction.

9. The electric machine (1) as claimed in claim 7, wherein the second transition zones (38) extend across a circumferential air gap (60), which is formed between two magnet segments (30) in the circumferential direction, and thus form a transition zone between two differently polarized sections (34, 32b) of the adjacent magnet segments (30).

10. The electric machine (1) as claimed in claim 1, wherein the transition zones (36) extend parallel to each other.

11. The electric machine (1) as claimed in claim 6, wherein the magnet segment (30) is of radially or elliptically concave form on the side facing the stator (10) in the region of the recesses (40) or of the further recesses (50).

12. The electric machine (1) as claimed in claim 1, wherein the magnet segments (30) have, on the side facing the stator (10), as viewed in the circumferential direction, widenings of the air gap which extend toward the edges of the magnet segments (30).

13. The electric machine (1) as claimed in claim 12, wherein the widenings of the air gap extend tangentially toward the edges of the magnet segments (30).

14. The electric machine (1) as claimed in claim 12, wherein the widenings of the air gap are of radially or elliptically concave form.

15. The electric machine (1) as claimed in claim 1, wherein the transition zones (36) extend over an entire axial extent of the magnet segments (30).

* * * * *